(12) United States Patent
Barach et al.

(10) Patent No.: US 7,325,059 B2
(45) Date of Patent: Jan. 29, 2008

(54) BOUNDED INDEX EXTENSIBLE HASH-BASED IPV6 ADDRESS LOOKUP METHOD

(75) Inventors: David Richard Barach, Boxborough, MA (US); Bobby Batacharia, Brookline, MA (US)

(73) Assignee: Cisco Technology, Inc., San Jose, CA (US)

( * ) Notice: Subject to any disclaimer, the term of this patent is extended or adjusted under 35 U.S.C. 154(b) by 901 days.

(21) Appl. No.: 10/439,022

(22) Filed: May 15, 2003

(65) Prior Publication Data

US 2004/0230696 A1   Nov. 18, 2004

(51) Int. Cl.
*G06F 15/173* (2006.01)

(52) U.S. Cl. ............ 709/225; 709/238; 709/245; 711/205; 711/206

(58) Field of Classification Search ............ 709/238, 709/245, 225, 228; 711/205–206; 370/351–356, 370/389, 392, 408
See application file for complete search history.

(56) References Cited

U.S. PATENT DOCUMENTS

| | | | |
|---|---|---|---|
| 6,011,795 | A | 1/2000 | Varghese et al. |
| 6,018,524 | A | 1/2000 | Turner et al. |
| 6,192,051 | B1 * | 2/2001 | Lipman et al. ............ 370/389 |
| 6,212,183 | B1 | 4/2001 | Wilford |
| 6,212,184 | B1 | 4/2001 | Venkatachary et al. |
| 6,266,706 | B1 * | 7/2001 | Brodnik et al. ............ 709/242 |
| 6,343,072 | B1 | 1/2002 | Bechtolsheim et al. |
| 6,374,326 | B1 | 4/2002 | Kanzal et al. |
| 6,424,650 | B1 * | 7/2002 | Yang et al. ............ 370/390 |
| 6,449,256 | B1 | 9/2002 | Varghese et al. |
| 6,516,383 | B1 | 2/2003 | Patra et al. |
| 6,563,823 | B1 | 5/2003 | Przygienda et al. |

(Continued)

FOREIGN PATENT DOCUMENTS

WO   WO 2004/105351 A2   12/2004

OTHER PUBLICATIONS

Radia Perlman, Interconnections, Second Edition: Bridges, Routers, Switches, and Internetworking Protocol, Addison-Wesley Longman, Inc., Chapter 13, pp. 347-365, Jan. 2000.

(Continued)

*Primary Examiner*—William Vaughn
*Assistant Examiner*—Mohamed Ibrahim
(74) *Attorney, Agent, or Firm*—Cesari and McKenna LLP

(57) ABSTRACT

The present invention provides a technique for efficiently looking up address-routing information in an intermediate network node, such as a router. To that end, the node locates routing information stored in its memory using one or more "lookup" tables (LUT) which can be searched using a small, bounded number of dependent lookups, thereby reducing the number of dependent lookups conventionally performed. The LUTs are arranged so each table provides routing information for network addresses whose subnet mask lengths are within a different range ("stride") of mask lengths. According to the technique, the node locates a network address's routing information by searching the LUTs, in order of decreasing prefix lengths, until the routing information is found. Preferably, several tables are searched in parallel. A match in a LUT may further point to a small MTRIE that enables the final bits of a prefix to be matched. That final MTRIE is searched using a relatively small, bounded number of dependent lookups.

22 Claims, 10 Drawing Sheets

U.S. PATENT DOCUMENTS

| | | | |
|---|---|---|---|
| 6,581,106 B1* | 6/2003 | Crescenzi et al. | 709/242 |
| 6,658,002 B1 | 12/2003 | Ross et al. | |
| 6,658,482 B1 | 12/2003 | Chen et al. | |
| 6,678,269 B1 | 1/2004 | Michels et al. | |
| 7,103,035 B1* | 9/2006 | Kanuri | 370/356 |
| 2004/0013113 A1* | 1/2004 | Singh et al. | 370/389 |
| 2004/0042463 A1* | 3/2004 | Guerrero et al. | 370/395.31 |
| 2004/0100950 A1* | 5/2004 | Basu et al. | 370/389 |

OTHER PUBLICATIONS

Radia Perlman, Interconnections, Second Edition: Bridges, Routers, Switches, and Internetworking Protocols, Addison-Wesley Longman, Inc., Chapter 9, pp. 189-220, Jan. 2000.

CISCO, How to Choose the Best Router Switching Path for Your Network, http://cisco.com/warp/public/105/20.html, pp. 1-11, Jan. 2003.

EZChip Technologies, IPv4 to IPv6 is Not Merely 50% More, White Paper, pp. 1-4, Aug. 10, 2003.

R. Hinden et al., IP Version 6 Addressing Architecture, RFC 2373, The Internet Society, pp. 1-26, Jul. 1998.

S. Deering et al., Internet Protocol, Version 6 (IPv6) Specification, RFC 2460, The Internet Society, pp. 1-40, Dec. 1998.

Felix Yuan, et al., Hierarchical Hash Method for Performing Forward Route Lookup, U.S. Appl. No. 10/377,841, filed Feb. 28, 2003.

"Written Opinion of the International Searching Authority" for International Application No. PCT/US2004/015281 with an International Filing date of May 13, 2004.

"International Search Report" for International Application No. PCT/US2004/015281 with an International Filing date of May 13, 2004.

Uga M et al: "A fast and compact longest match prefix look-up method using pointer cache for very long network address" IEEE Computer Communications and Networks, Proceedings, Eighth International Conference, Boston, MA, ISBN 0-7803-5794-9, pp. 595-602, Oct. 11-13, 1999.

* cited by examiner

HASH TABLE LAYOUT
WITH CONSTANT 16-BIT STRIDE
400

| HASH TABLE | MINIMUM SUBNET MASK LENGTH | MAXIMUM SUBNET MASK LENGTH | PREFIX BITS HASHED |
|---|---|---|---|
| 1 | /113 | /128 | 0-111 |
| 2 | /97 | /112 | 0-95 |
| 3 | /81 | /96 | 0-79 |
| 4 | /65 | /80 | 0-63 |
| 5 | /49 | /64 | 0-47 |
| 6 | /33 | /48 | 0-31 |
| 7 | /17 | /32 | 0-15 |
|   | /1 | /16 | MTRIE |

BOUNDED INDEX EXTENSIBLE HASH-BASED IPV6 ADDRESS LOOKUP METHOD

RELATED APPLICATIONS

This application is related to U.S. patent application Ser. No. 10/377,841, entitled HIERARCHICAL HASH METHOD FOR PERFORMING FORWARD ROUTE LOOKUP, by Felix Yuan, et al., the teachings of which are expressly incorporated herein by reference.

FIELD OF THE INVENTION

This invention relates generally to network communications, and, more specifically, to making forwarding decisions in an intermediate network node, such as a router.

BACKGROUND OF THE INVENTION

A computer network is a geographically distributed collection of interconnected subnetworks for transporting data between nodes, such as computers. A local area network (LAN) is an example of such a subnetwork; a plurality of LANs may be further interconnected by an intermediate network node, such as a router or switch, to extend the effective "size" of the computer network and increase the number of communicating nodes. The nodes typically communicate by exchanging discrete packets of data according to predefined protocols. The data packets transferred among the nodes may include fixed sized data cells and/or variable sized data frames. The packets typically comprise "payload" data prepended ("encapsulated") by at least one network header formatted in accordance with a communication protocol, such as the Transmission Control Protocol/Internet Protocol (TCP/IP). In this context, a protocol consists of a set of rules defining how the nodes interact with each other.

Broadly stated, an intermediate network node is configured to exchange data packets between nodes connected to a wide range of communication links and subnetworks. To that end, the intermediate node implements a set of network services for the communicating nodes. The set of services may include route processing, path determination and path switching functions. The route processing function determines the type of routing needed for a received packet, whereas the path switching function allows the intermediate node to accept a packet on a first interface and forward it on a second interface. The path determination, or forwarding decision, function selects the most appropriate interface for forwarding a packet.

Forwarding decisions in an intermediate network node are typically performed by a forwarding engine in the node. The engine may be implemented in software, hardware or any combination thereof. For example, the engine may be embodied as software or firmware which is executable by an application specific integrated circuit (ASIC), field programmable gate array (FPGA), general-purpose processor, special-purpose processor, etc. A data packet is received at one of the node's network interfaces, e.g., coupled to a point-to-point link, Ethernet link, wireless link, optical link, etc. The node's network interface parses network headers from the packet and transfers them to the forwarding engine for processing. Notably, the headers may be processed in accordance with different layers of a network protocol stack, such as that described by the Open Systems Interconnection (OSI) Reference Model. For instance, the engine may be configured to operate at a data link layer (layer 2) or at a network protocol layer (layer 3) of the conventional OSI Model.

The forwarding engine makes a forwarding decision for a received packet header by examining a destination address contained in the header. The header typically includes, inter alia, source and destination addresses that identify the packet's sending and receiving nodes, respectively. Thus, the packet may "hop" from node to node, along an optimal network path, until it reaches its ultimate destination. Accordingly, the forwarding engine may route a packet to its next hop, replacing the media access control (MAC) layer-2 header of the packet as necessary.

The next hop for the packet is determined by routing information stored in the intermediate network node. Routing information is broadly understood to include any information, such as adjacency information, bridge-forwarding information, etc., used to implement the node's network services. The intermediate network node usually stores its routing information in data structures accessible to the forwarding engine. The routing information enables the engine to determine the next hop, and, in some cases, provide other services (quality-of-service, billing, etc.). In operation, the forwarding engine parses a destination address from a received packet header and performs an "address lookup" operation to determine whether any of the node's data structures contains routing information corresponding to the parsed address. If so, the next hop is chosen, and the packet is switched to the corresponding egress interface, with its layer-2 (MAC) information modified appropriately.

Often, layer-3 forwarding decisions performed in an intermediate network node are based on Internet Protocol Version 4 (IPv4) network addresses. According to the IPv4 address format, network addresses are represented as 32 bit (four byte) values, typically denoted by four numbers between 0 and 255. Thus, each interconnected subnetwork may be assigned a unique range of IPv4 addresses. For example, an exemplary subnetwork may be allocated the address space 212.47.101.*, where the asterisk is a wildcard that can differentiate up to 256 individual nodes in the subnetwork. For instance, a first node in the subnetwork may be assigned the address 212.47.101.1, whereas a second node may be assigned the address 212.47.101.2.

A subnetwork is often associated with a subnet mask that may be used to select a set of contiguous prefix bits from network addresses within the subnetwork's address space. The selected prefix bits are used, e.g., by an intermediate network node, to locate a route to the subnetwork. As used herein, a subnet mask length indicates the number of prefix bits selected by a subnet mask, and a subnet mask length of N bits is hereinafter represented as /N. For example, assume an exemplary subnetwork is associated with /25 network addresses. Therefore, the exemplary subnetwork may be associated with a subnet mask (e.g., 0xFFFFFF80) indicating that a prefix of the first 25 most-significant bits in a network address are required to locate a route to the subnetwork. Subnet masks and their uses are more generally described in Chapter 9 of the reference book entitled *Interconnections Second Edition*, by Radia Perlman, published September 1999, which is hereby incorporated by reference as though fully set forth herein.

Although it has performed well, several deficiencies have been identified with the IPv4 protocol. One of the primary deficiencies is its limited number of addresses. Specifically, IPv4's 32-bit addresses are expected to be exhausted in the next few years. As a result, work has been ongoing to develop a replacement for IPv4, namely the Internet Protocol Version 6 (IPv6). IPv6 addresses are 128 bits—four times longer than current IPv4 addresses—and consequently provide a significant increase in the number of available IP addresses. The IPv6 protocol and its addressing architecture are generally described by the Request for Comments (RFC) 2460 and 2373, respectively entitled *Internet Protocol, Version 6 (IPv6) Specification* and *IP Version 6 Addressing Architecture*, which are hereby incorporated by reference as though fully set forth herein.

Although IPv6 substantially increases the available IP address space, forwarding decisions based on 128-bit IPv6 addresses also consume more resources, such as memory, power or processing bandwidth, than those based on 32-bit IPv4 addresses. Conventional IPv4 address-lookup techniques, usually employed by a forwarding engine in an intermediate node, often cannot efficiently locate (i.e., "lookup") routing information for IPv6 addresses. These previous IPv4 address-lookup techniques, which may be implemented using a radix trie (RTRIE), multiway trie (MTRIE), hash table, or content addressable memory (CAM), typically consume inordinate amounts of memory, power or processing resources when used to perform IPv6 address lookups.

For example, a forwarding engine may perform IPv6 address lookups by searching an RTRIE. An RTRIE is a type of binary trie whose "leaf" nodes contain pointers to other data structures storing routing information. "Trie"-type data structures are generally described in Chapter 13 of the reference book entitled *Interconnections Second Edition*, by Radia Perlman, which is hereby incorporated by reference as though fully set forth herein. Routing information for an IPv6 address may be located by searching an RTRIE on a bit-by-bit basis until the address's corresponding leaf node is found. The number of dependent lookups required to search the RTRIE typically depends on the number of address bits needed to differentiate between different addresses in the routing table. As used herein, a dependent lookup is broadly understood as a memory access operation that cannot be performed until a prior operation, such as a prior memory access, has been completed. Consequently, a sequence of dependent lookups must be performed sequentially.

By way of further example, suppose an RTRIE contains only two leaf nodes corresponding to the IPv6 addresses FFFF:: and FFFE::, so only one bit (i.e., the $16^{th}$ most-significant bit, which is address bit 113) is needed to differentiate the addresses. Here (and hereinafter), the standard hexadecimal IPv6 address notation described in RFC 2373 is employed, where a double colon indicates a contiguous string of zeros. In this example, the leaf node for either address can be located by performing only one lookup in the RTRIE, e.g., based on the value of bit 113. If the address FFFD:: is added to the RTRIE, then two dependent lookups may have to be performed (e.g., based on bits 114 and 113). As additional IPv6 addresses are added to the RTRIE, the number of dependent lookups needed to locate an address's routing information increases.

When the RTRIE stores many more IPv6 addresses than in the above-described example, the number of dependent lookups performed in the RTRIE may become unreasonable. In the pathological case, 128 dependent lookups would have to be performed before an IPv6 address can be located in the RTRIE. A large number of dependent reads for every prefix is an undesirable quality of a routing algorithm. Further, one lookup may be distinguished by a single bit in the RTRIE, whereas another lookup in the same RTRIE may require many dependent reads. This variability in lookup time is another undesirable quality in a routing algorithm.

The forwarding engine may also perform IPv6 address lookups by searching an MTRIE. The MTRIE includes a root node which consists of an array that is indexed by a first portion of an IPv6 address. Each array element in the root node can store a pointer that references a corresponding "first-level" node. Thus, a root-node array comprising $2^N$ entries may reference up to $2^N$ different first-level nodes. Each first-level node is an array which is indexed by a second portion of the IPv6 address. Array elements in each first-level node may contain pointers that reference corresponding "second-level" nodes. In this hierarchical manner, successive levels in the MTRIE comprise an exponential number of nodes (i.e., arrays), each of which is indexed by a different portion of the IPv6 address. An IPv6 address lookup therefore involves traversing the MTRIE until an array element is located that contains a pointer to the address's routing information. Array elements "not in use" may store pointers that reference default routing information, or, alternatively, may store degenerate values, such as NULL values.

An MTRIE can hence be constructed such that the number of dependent reads required is bounded to a reasonable number. However, the amount of memory consumed increases dramatically as a consequence of the size of the array that must be allocated at each level. The "stride" (number of bits examined at each level) of an MTRIE may be "tuned" to reduce the memory overhead. Tuning essentially trades off the number of nodes that are expected to be allocated at a particular level for the size of the array at that level. Accordingly, for small array sizes and few MTRIE levels, e.g., as conventionally required for IPv4 address lookups, the MTRIE may be implemented in a reasonable amount of memory. However, for 128-bit IPv6 addresses, the number of MTRIE levels and the amount of memory required to maintain those levels is impractical. As IPv6 is early in its adoption cycle, the distribution of routes cannot be reliably predicted. Hence, variable stride-tuning techniques may be required to implement IPv6 lookups in an MTRIE, and such techniques are generally undesirable. Moreover, the number of dependent MTRIE lookups needed to locate routing information for an IPv6 address may also be prohibitive with regards to processing resources.

Some forwarding engines perform IPv6 address lookups by searching a hash table. The hash table is an array whose entries may be indexed by applying a conventional hash function to an IPv6 address, or a portion thereof. In practice, the process of hashing different addresses may generate the same index into the table thereby resulting in a "collision." In an ideal scenario, the hash table is large enough to accommodate every IPv6 address stored in the intermediate node and very few collisions would occur. For small address spaces, this can be achieved.

However, in reality, the size of the hash table is limited, e.g., by the node's memory availability, and collisions often occur when the table stores large numbers of IPv6 addresses. Therefore, each hash-table entry may be associated with a corresponding list of colliding addresses. Unfortunately, such a list is typically searched linearly every time the hash-table entry is indexed, often resulting in an unacceptable number of dependent lookups. Furthermore, if the entry's list is configured to store a maximum number of colliding addresses, some addresses may not be able to fit into the list. In this situation, the forwarding engine cannot locate those addresses' routing information through the hash table, and consequently the engine may have to defer the lookup to a backup mechanism.

A forwarding engine may employ a content addressable memory instead of a hash table or trie-based data structure to perform IPv6 address lookups. The CAM is a storage device that includes logic and circuitry for storing data at a memory location defined by the value of the data. Accordingly, the CAM may be configured to store an IPv6 address's routing information at a memory location defined by the value of the IPv6 address.

While a CAM can perform address lookups relatively quickly, it suffers a number of significant disadvantages. For example, the CAM densities are limited, and the number of routes that can be stored has a hard limit (e.g., an 18 Mbit CAM may store 125,000 IPv6 routes with little room for expansion). As a consequence, multiple CAM devices may be required to perform IPv6 address lookups for larger routing tables. In addition, CAMs consume relatively large amounts of electrical power compared to other forms of memory devices, such as dynamic random access memories (DRAM). Further, CAMs are currently more expensive than other conventional storage devices. In sum, for some applications, the disadvantages of implementing CAMs in the forwarding engine outweigh the their ability to perform fast IPv6 address lookups.

Therefore, it is desirable to provide an IPv6 address lookup technique that is deterministic, and that employs fewer dependent lookups and less memory than a hash table or trie-based implementation. In addition, the technique should be capable of performing address lookups for large route densities (e.g., 1,000,000 routes) without consuming excessive amounts of power. The technique also should not punt its operation to other, possibly slower, address lookup algorithms.

SUMMARY OF THE INVENTION

The present invention provides a technique for efficiently looking up address-routing information in an intermediate network node, such as a router. To that end, the node locates routing information stored in its memory using one or more "lookup" tables (LUT) which can be searched using a small, bounded number of dependent lookups, thereby reducing the number of dependent lookups conventionally performed. The LUTs are arranged so each table provides routing information for network addresses whose subnet mask lengths are within a different range ("stride") of mask lengths. According to the technique, the node locates a network address's routing information by searching the LUTs, in order of decreasing prefix lengths, until the routing information is found. Preferably, several tables are searched in parallel. A match in a LUT may further point to a small MTRIE that enables the final bits of a prefix to be matched. That final MTRIE is searched using a relatively small, bounded number of dependent lookups.

In an illustrative embodiment, every LUT is preferably organized as a hash table having a plurality of entries, each of which may store a pointer referencing the location of a corresponding "second-level" table. Each second-level table is preferably organized as a hash table containing a plurality of "pages," e.g., $2^m$ pages (m=0, 1, 2, . . . ), which are configured to store memory locations of routing information associated with a predetermined number (e.g., 2) of network addresses. Accordingly, an intermediate network node may locate routing information associated with a network address, such as an IPv6 address, by looking up an appropriate entry in a LUT, hence locating the entry's corresponding second-level table, and then looking up an appropriate page in the second-level table and searching the page's contents for the routing information's memory location in the node.

In operation, the memory location of a network address's routing information may be retrieved from a LUT as follows: first, an index into the LUT is generated by hashing a first set of address bits using a first hash function, such as a cyclic redundancy check (CRC) function. Illustratively, the first set of address bits is determined by the LUT's associated stride. Second, the generated index is used to lookup a corresponding LUT entry, which, if populated, references a second-level table. Third, an index to a page in the second-level table is generated by hashing a second set of address bits with a second hash function. Notably, the first and second hash functions may be the same function, and the first and second sets of address bits also may be the same. The contents of the indexed page are then searched, in order of decreasing prefix lengths, to locate the memory location of the address's routing information.

Further to the inventive technique, each second-level table may be re-configured "on the fly." Specifically, when a new network address is inserted into a page that is "full," the newly added address still may be inserted into the second-level table by performing at least one of the following: (a) doubling the number of pages in the second-level table, (b) redistributing network addresses in the second-level table or (c) if the new address is similar to an address already in the second-level table, storing the new address in an MTRIE accessible through the second-level table. Here, an MTRIE accessible from a page is organized to store the memory locations of routing information corresponding to the page's network addresses having the smallest (i.e., "least-precise") subnet mask lengths. That is, all subsequent "less precise" prefixes are added to the MTRIE for the second-level match.

Advantageously, the inventive technique enables an intermediate node to locate a network address's routing information using fewer dependent lookups than conventionally required, without substantially increasing its memory or power consumption, or decreasing its route density. Further, the technique enables the node to locate routing information without defaulting (i.e., "punting") to other, possibly slower address-lookup algorithms. In addition, the technique may be made even more efficient by implementing the LUTs in CAMs and/or in a multiprocessor environment.

BRIEF DESCRIPTION OF THE DRAWINGS

The above and further advantages of the invention may be better understood by referring to the following description in conjunction with the accompanying drawings in which like reference numerals indicate identically or functionally similar elements, of which:

FIG. 4 is a LUT layout describing an exemplary set of hash tables, arranged according to 16-bit subnet mask length "strides," that may be used to store the locations of routing information in accordance with the present invention;

DETAILED DESCRIPTION OF ILLUSTRATIVE EMBODIMENTS

A. Intermediate Network Nodes

Figure 1:
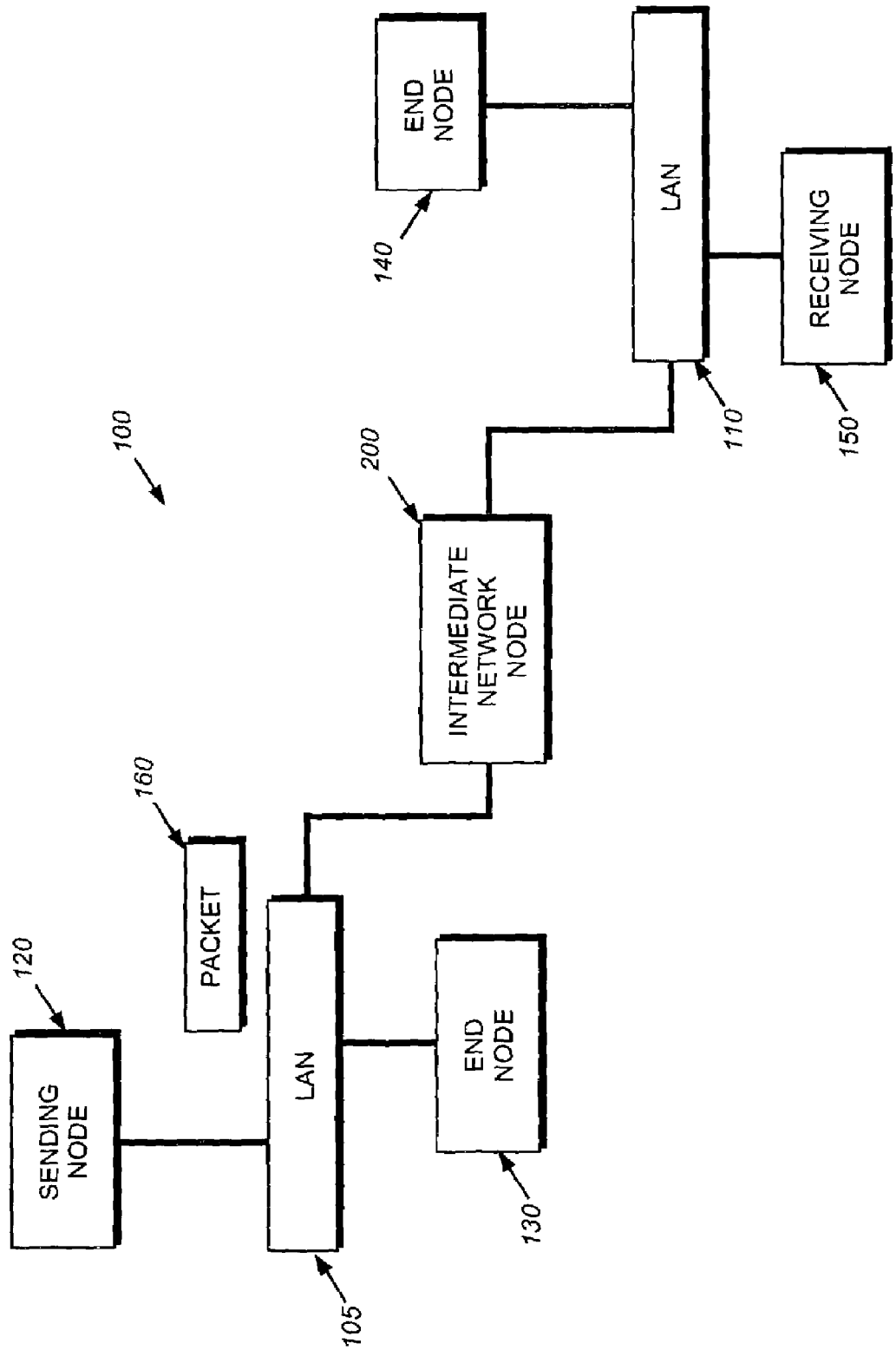
FIG. 1 is a schematic block diagram of a computer network comprising a collection of interconnected subnetworks and nodes, including an intermediate network node.

FIG. 1 is a block diagram of a computer network 100 comprising a collection of interconnected subnetworks and nodes. The nodes may comprise computers including end nodes 130 and 140, such as a sending end node 120 and a receiving end node 150, and an intermediate network node 200, the latter of which may be a switch or router. The subnetworks 105, 110 included within network 100 are preferably local area networks (LANs) interconnected by the intermediate node 200, although the networks may comprise other communication links, such as wide area networks. Communication among the nodes coupled to the LANs is typically effected by exchanging discrete packets 160 among the nodes.

For example, the sending node 120 generates a data packet 160 by encapsulating "payload" data within headers, such as conventional data link and network layer headers, as the data passes through different layers of a protocol stack. The packet is then transmitted over the network to the intermediate node 200 which facilitates the flow of the data packet through the network by routing it to the proper receiving node 150. Specifically, the node 200 receives the packet from an input port, parses the data link and network layer headers, renders a forwarding decision for the packet, appends a new data link header to the packet and then transmits the packet to an output port.

Figure 2:
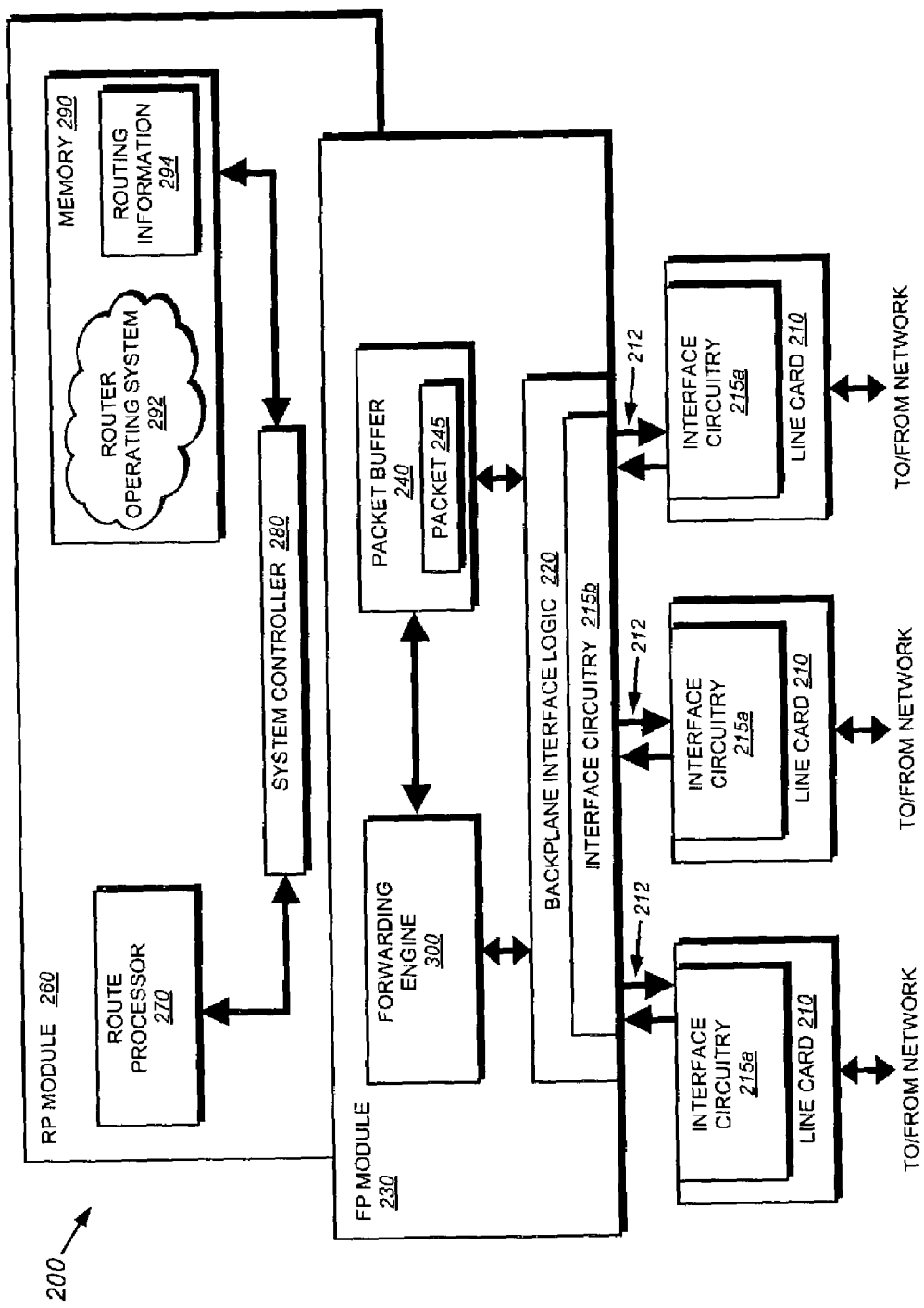
FIG. 2 is a schematic block diagram of an illustrative intermediate network node.

FIG. 2 is a schematic block diagram of an intermediate node 200 that may be advantageously used with the present invention. The node comprises a plurality of line cards 210, a forwarding processor (FP) module 230, and a route processor (RP) module 260. Data is received by the line cards, each of which is coupled to at least one network, such as LANs 105 and 110. More specifically, the line cards may be configured to transfer data to/from more than one type of network, including, inter alia, asynchronous transfer mode (ATM), synchronous optical networks (SONET), frame relay, Ethernet, Fiber Distributed Data Interface (FDDI), etc.

The line cards 210 are coupled to a backplane logic circuit 220 by a plurality of high-speed unidirectional (i.e., point-to-point) links 212. Preferably, the backplane logic circuit is embodied as a high performance application specific integrated circuit (ASIC) comprising an interface circuitry 215b coupled to the unidirectional links. Corresponding interface circuitry 215a, preferably embodied within a high performance ASIC resident on each of the line cards, couples the line cards to the unidirectional links. The interface circuitry generally converts conventional formats of data received at the line cards to a protocol format for transmission over the unidirectional links, and vice-versa.

Broadly stated, the functional infrastructure of the intermediate node is divided into a data plane and a control plane. The data plane includes components used to retrieve data packets from a network and, when necessary, provide a forwarding decision for those packets. To that end, the data plane extends from the line cards 210 to the unidirectional links 212, through the links to the backplane interface logic 220, and through the backplane to a forwarding engine 300 (such as an array of processors) in the FP module 230. The forwarding engine essentially comprises the forwarding path functionality of the intermediate node and may be implemented as microcoded hardware in the data plane. A packet buffer 240 may store data packets 160 while the forwarding engine processes their associated headers when determining where and when the packets should be forwarded. The processed headers are merged with their respective data packets, and the resultant packets are transferred from the backplane to an appropriate line card and network.

The control plane, on the other hand, includes those entities used to manage/control operation of the intermediate node and, to that end, extends from the backplane interface logic 220 to a route processor 270 (such as a general purpose MIPS processor) on the RP module 260. Although not shown, a bus, such as a peripheral component interconnect (PCI) bus, couples the backplane logic on the FP module with a system controller 280 on the RP module. The route processor is configured to perform configuration management functions for the intermediate node, such as constructing and loading routing tables used by the FP module 230.

The route processor 270 is coupled to the system controller 280 and a memory 290. The memory may comprise synchronous dynamic random access memory (SDRAM) storage locations addressable by the route processor and system controller for storing software programs, buffer pools, data structures, etc. For example, the memory 290 may store one or more data structures containing the node's routing information 294, such as its adjacency information, bridge-forwarding information, etc. A network routing operating system 292, portions of which are typically resident in the memory 290, is executed by the route processor for performing control/management operations. An example of a network routing operating system that may be advantageously used with the present invention is the Internetworking Operating System (IOS®) of Cisco Systems. It will be apparent to those skilled in the art that other memory means, including various computer readable media, may also be used for storing and executing program instructions pertaining to the operation of the intermediate node 200.

Figure 3:
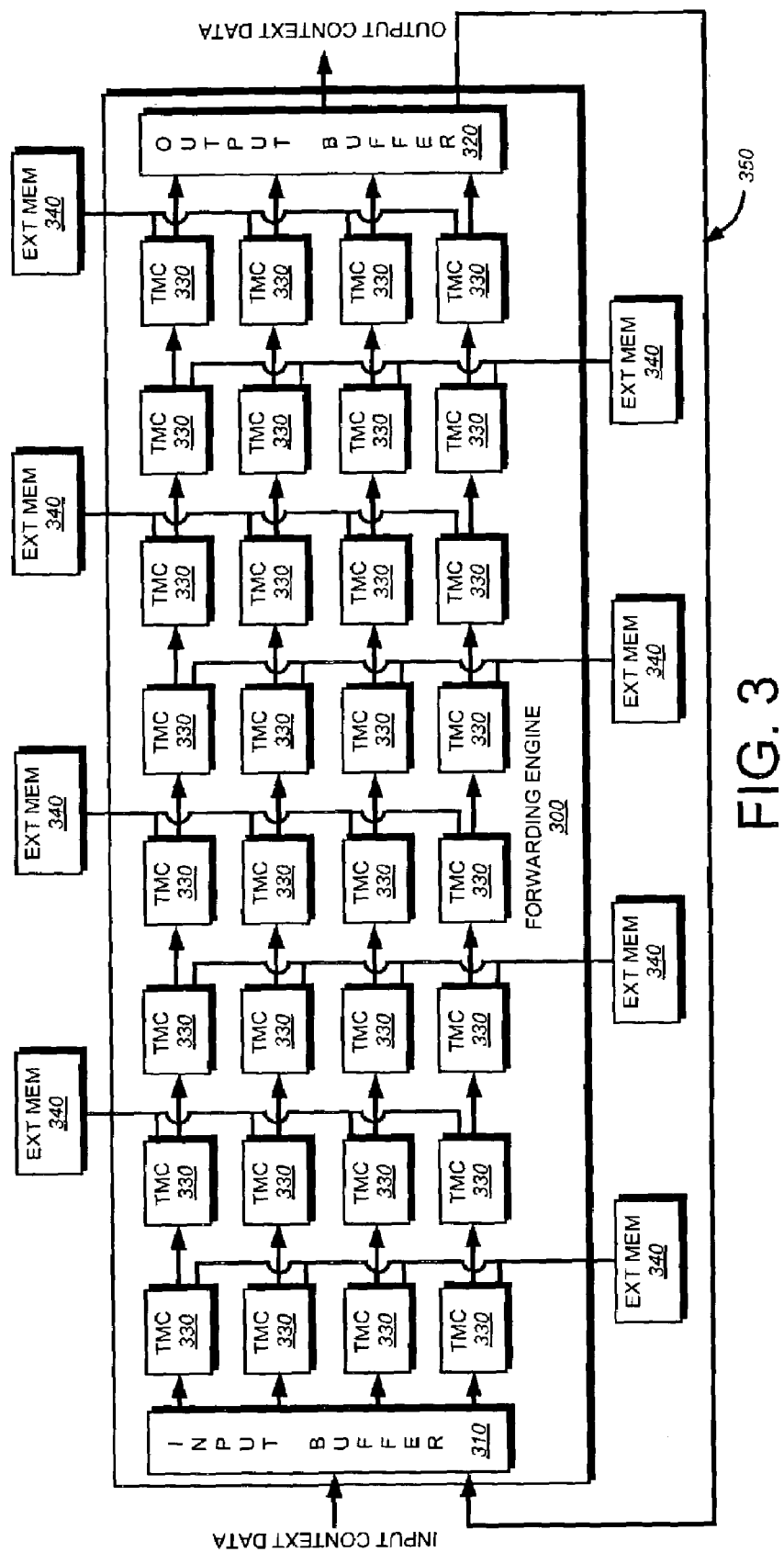
FIG. 3 is a schematic block diagram of a forwarding engine that advantageously may be implemented in an intermediate network node of the present invention.

FIG. 3 is a schematic block diagram of the forwarding engine 300 comprising an array of processing elements (TMCs) 330 embedded between input and output header buffers and coupled to a memory partitioned into a plurality of external memory (EXT MEM) resources 340. The EXT MEM resources 340 comprise random access memory (RAM) storage locations addressable by the processing elements 330 for storing, e.g., data structures accessed by the elements 330. Each processing element 330 illustratively includes a pipelined processor that contains, inter alia, a plurality of arithmetic logic units (ALUs) and a register file having a plurality of general purpose registers that store intermediate result information processed by the ALUs. The processing elements 330 may be arrayed into multiple rows and columns, and further configured as a multi-dimensioned systolic array. In the illustrative embodiment, the processing elements 330 are arrayed as four (4) rows and eight (8) columns in a 4×8 arrayed configuration that is embedded between an input buffer 310 and an output buffer 320. However, it should be noted that other arrangements, such as an 8×8 arrayed configuration, may be advantageously used with the present invention.

The processing elements 330 of each row are configured as stages of a "pipeline" that sequentially execute operations on transient data, such as a packet header, loaded by the input buffer 310. In contrast, the processing elements 330 of each column operate in parallel to perform substantially the same operation on the transient data, but with a shifted phase. Each phase comprises a predetermined number of clock cycles, e.g., 192 cycles. Each EXT MEM 340 is dedicated to a respective column of processing elements 330 and further configured with non-transient table data needed to support the similar function(s) performed by the columned processing elements. Since processing elements in the same column share access to a common memory resource 340, clock cycles in a phase may be divided into smaller "phaselets," e.g., 24 cycles, that are apportioned to the column's processing elements to prevent memory access conflicts. Sequencing circuitry of the input buffer 310 controls the processing elements 330 of each pipeline by ensuring that each element 330 completes processing of current transient data before loading new transient data into the pipeline at a new phase. In general, a new phase of processing is started, i.e., a context switch is performed, when all of the elements 330 finish processing their current transient data (current context) and a new incoming transient data (new context) is completely received by the input buffer. Transient data that has been fully processed by the forwarding engine exits the output buffer 320. However, transient data requiring additional processing may be routed back to the input buffer 310 over a feedback path 350 for another "pass" through the engine's multiprocessor array.

The forwarding engine 300 may be configured to perform one or more of the network services provided by the intermediate node 200. For instance, when the forwarding engine is configured to perform the node's forwarding decisions, the input buffer 310 may load a plurality of packet headers, e.g., from the packet buffer 240, in a single phase. The loaded headers are subsequently processed in parallel by different rows in the forwarding engine. To that end, processing elements 330 in each column may be configured to concurrently perform the same forwarding-decision operation(s) on the rows' packet headers. For example, processing elements in one or more of the columns may be configured to lookup routing information 294 for network addresses, such as IPv6 addresses, specified in the headers. Illustratively, the routing information is copied from the memory 290 to one or more EXT MEM resources 340 available to the processing elements. In this way, the processing elements 330 can lookup the routing information 294 directly from the forwarding engine 300's EXT MEM resources 340.

B. Logical Organization of Lookup Tables

In accordance with an illustrative embodiment, processing elements 330 in one or more columns of the forwarding engine 300 may be configured to locate an address's routing information 294 by searching a set of "lookup" tables (LUT) stored in one or more external memory resources 340. Advantageously, each LUT can be searched using a small, bounded number (e.g., 3-5) of dependent lookups without having to default (i.e., punt) to other, possibly less efficient, address-lookup algorithms. Each LUT stores the memory locations of routing information (in external memory) associated with network addresses whose subnet mask lengths are within a predefined range ("stride") of mask lengths. Further, every LUT is preferably organized as a hash table having a plurality of entries which may be indexed based on the result of applying a hash function to a network address, such as an IPv6 address, or to a portion thereof.

FIG. 4 illustrates a hash-table layout 400 describing the contents of an exemplary set of hash tables 410 that may be searched by the forwarding engine 300. Illustratively, the hash tables are stored in one or more of the external memories 340 and are accessible to the processing elements 330. By way of example, assume routing information corresponding to 128-bit IPv6 addresses is accessible through the hash tables. Further, assume the tables are organized according to constant 16-bit strides, such that each table is associated with a different non-overlapping range of 16 subnet mask lengths. Of course, those skilled in the art will appreciate that the hash tables need not be associated with constant strides, e.g., 16-bit strides, and the tables may store network addresses of various bit lengths, not only 128-bit addresses.

According to the illustrative hash-table layout 400, each hash table 410 stores the location of routing information for network addresses having subnet mask lengths between a minimum mask length 420 and a maximum mask length 430, inclusive. Thus, the mask lengths 420 and 430 define the table's associated stride. For example, the location of routing information for an address having a subnet mask length equal to /45 is stored in the hash table 6, whose associated stride includes the range of subnet mask lengths /33-/48. For reasons explained below, the locations of routing information for addresses having subnet mask lengths within the "least-precise" stride, i.e., /1 to /16, may be stored in an MTRIE rather than a hash table.

Entries, or "hash lines," in each hash table 410 are accessed by applying a hash function, such as a 32-bit CRC(CRC32) function, to a predetermined range of "prefix" address bits 440. In the illustrative embodiment, the range of prefix bits 440 is defined by a sequence of consecutive address bits beginning with the address's most-significant bit. The number of bits in the sequence is one less than the table's minimum mask length 420. For instance, the hash table 1, having a minimum subnet mask length equal to /113, is indexed by hashing 112 prefix address bits (i.e., bits 0-111). Similarly, an index into the hash table 2, having a minimum subnet mask length equal to /97, is generated by hashing 96 prefix bits (i.e., bits 0-95). More generally, N−1 prefix bits are hashed to generate an index into a hash table whose minimum subnet mask length is /N. Because there are no prefix bits to hash when the minimum subnet mask length is /1, routing information for addresses having subnet mask lengths within the stride /1 to /16 is accessible through, e.g., a conventional 4:4:4:4 MTRIE.

According to the illustrative embodiment, every hash table 410 has a plurality of entries, e.g., $2^9$ entries, each of which may store a pointer referencing the location of a corresponding "second-level" table. Each second-level table is preferably organized as a hash table containing a plurality of "pages," e.g., $2^n$ pages (n=0, 1, 2, . . . ), which are configured to store memory locations of routing information associated with a predetermined number (e.g., 2) of network addresses. Accordingly, the hash tables 410 may be considered as "first-level" tables through which an appropriate second-level table storing an address's routing information may be located.

Figure 5:
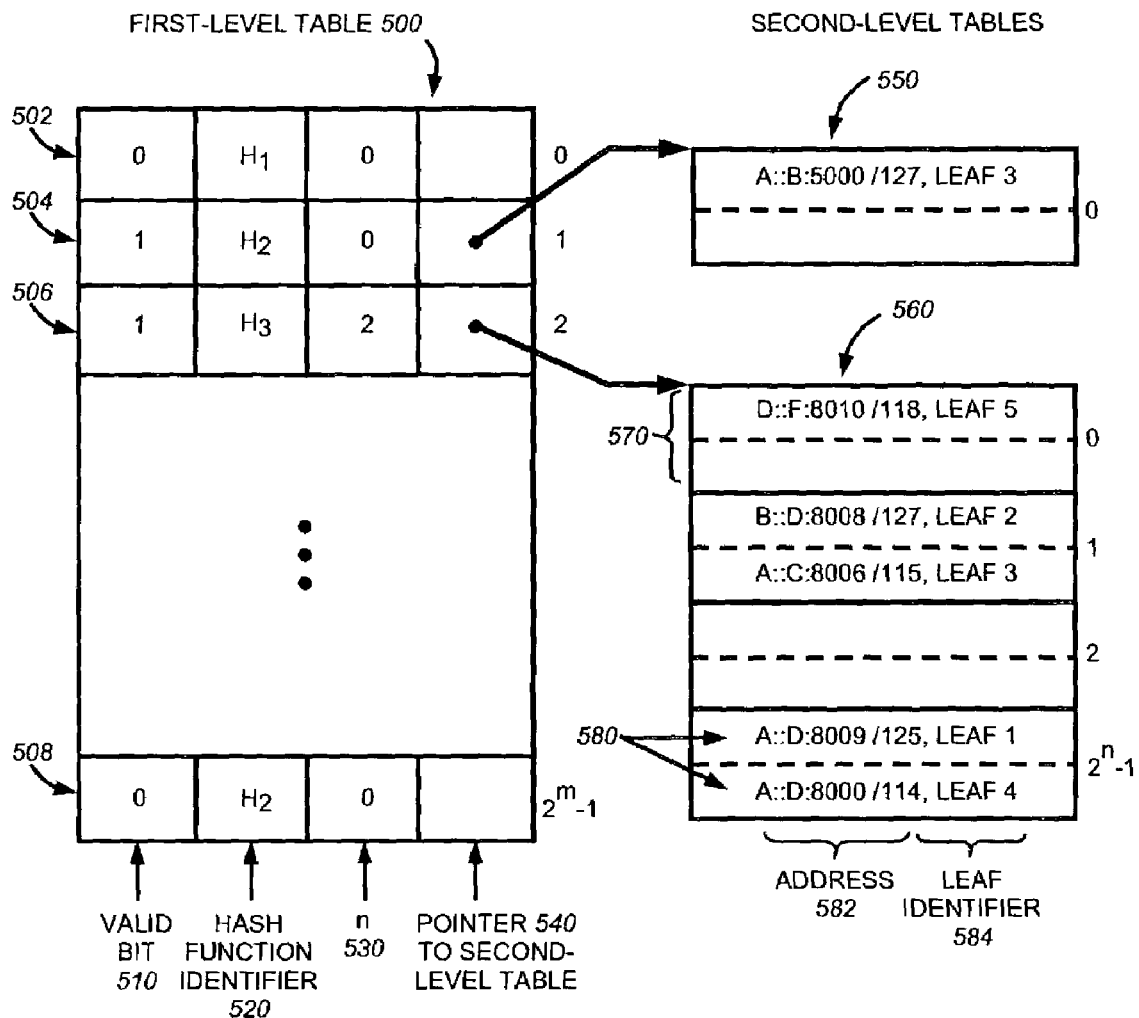
FIG. 5 is a schematic block diagram of an exemplary hash table and its associated second-level tables.

FIG. 5 is a schematic block diagram of an exemplary first-level hash table 500 and two of its associated second-level hash tables 550 and 560. The table 500 contains a plurality of indexed hash lines, e.g., $2^m$ hash lines. For example, the hash lines 502, 504, 506 and 508 correspond to hash-table entries having indexes equal to 0, 1, 2 and $2^m-1$, respectively. Operationally, a hash line in the hash table 500 is indexed by applying a first hash function ($H_o$) to a set of prefix bits in a network address, such as an IPv6 address. As previously described with regards to FIG. 4, the set of hashed prefix bits may coincide with a predefined range of prefix bits 440 associated with the table 500. For example, if the hash table stores /113-/128 addresses, then 112 prefix bits (i.e., bits 0-111) may be hashed to generate an index into the hash table. If necessary, the result of hashing the prefix bits may be truncated, or otherwise masked, to ensure that the generated hash-line index equals a value between 0 and $2^m-1$. For instance, if the index generated by the hash function $H_o$ is a 32-bit value, but the hash table 500 only contains $2^9$ hash lines, then 23 bits of the generated hash value may be truncated or masked.

Each indexed hash line stores a valid bit 510, a hash-function identifier 520, a value n 530 indicating the number of pages in the hash line's corresponding second-level table, and a pointer 540 to the hash line's corresponding second-level table. The value of a hash line's valid bit 510 indicates whether the location of routing information for at least one network address is stored in the hash line's second-level table. For example, in the hash table 500, the valid bits 510 equal to "0" indicate that network-address routing information cannot be accessed through the hash-table entries 502 and 508. In contrast, the valid bits 510 equal to "1" in hash lines 504 and 506 indicate that the location of routing information for at least one network address is stored in each of the second-level tables 550 and 560.

The hash-function identifier 520 identifies a second hash function ($H_x$, x=0, 1, 2, . . . ) that may be applied to a second set of address bits for indexing a page in a second-level table. The second hash function $H_x$ may be the same function as the first hash function $H_o$. Preferably, the second set of address bits is the same range of prefix bits 440 associated with the first-level table. For example, if the first-level table 500 stores /113-/128 addresses, then 112 prefix address bits (i.e., bits 0-111) may be hashed using the second hash function to generate an index into a second-level table. The second hash function $H_x$ is used to randomly distribute network addresses within the second-level table's pages.

Each hash line in the first-level hash table 500 may be associated with a different hash function $H_x$. For instance, hash lines 502, 504 and 506 rely on different second hash functions $H_1$, $H_2$ and $H_3$ to generate indexes into their respective second-level tables. Alternatively, two or more hash lines may use the same hash function $H_x$, such as hash lines 504 and 508. While the hash functions $H_x$ may implement different hashing algorithms, such as the Message-Digest 5 (MD5) algorithm, CRC32 algorithm or selective exclusive-OR (XOR) operations, it is also expressly contemplated that they may employ a common hashing algorithm using different "seed" values. For instance, the hash functions $H_1$, $H_2$ and $H_3$ each may correspond to the same CRC32 hash function using different initial values (or seed values). In this case, a hash-function identifier 520 may identify an appropriate seed value used to initialize the hash function $H_x$.

So noted, the value n 530 indicates the number of pages in the hash line's corresponding second-level table. Since each second-level table illustratively contains $2^n$ pages, the value n equals the base-2 logarithm of the number of pages in the hash line's second-level table. Therefore, the value n indicates the number of bits needed to index a page in the second-level table. For example, suppose a CRC32 hash function $H_x$ is used to generate an index into a second-level table having four pages (i.e., n=2). In this case, only two bits of the 32-bit index generated by the CRC32 function are needed to locate one of the second-level table's four pages. Thus, 30 bits of the generated 32-bit index may be masked or truncated to generate a valid index into the second-level table.

Each valid hash line contains a pointer 540 referencing the memory location of the hash line's corresponding second-level table. For instance, the valid hash lines 504 and 506 contain pointers 540 storing the locations of their corresponding second-level tables 550 and 560. Alternatively, in place of a pointer 540, a hash line 504 instead may contain an index indicating the address of its corresponding second-level table. Each second-level table contains $2^n$ indexed pages 570. As shown, each page contains two "buckets" 580 (i.e., entries), although those skilled in the art will appreciate that an arbitrary number of buckets may be included in each page.

Each bucket 580 is configured to store a network address 582, including the address's associated subnet mask length, and a "leaf" identifier 584. As used herein, a "leaf" is a data structure located in the external memory 340 that stores routing information 294, such as adjacency information, bridge-forwarding information, etc. The leaf identifier 584 therefore may be a pointer that references a leaf's memory location in an external memory resource 340. Accordingly, the leaf identifier 584 may be used to locate routing information for its associated network address 582. Notably, different network addresses may rely on the same routing information, and consequently may be paired to the same leaf identifier. For instance, in FIG. 5, routing information for the IPv6 addresses A::B:5000/127 and A::C:8006/115 is stored in the same leaf, e.g., Leaf 3. Here, A, B and C are arbitrary values and A::B and A::C denote arbitrary 112-bit prefixes.

Preferably, network addresses stored in a page's buckets are listed in order of decreasing prefix lengths. That is, the first ("top-most") bucket in a page stores the page's most-precise network address. For instance, the two IPv6 addresses, B::D:8008/127 and A::C:8006/115, stored in page 1 of the second-level table 560 are listed in order of decreasing prefix length. When a page contains only one network address, such as the page in table 550, the top-most bucket in the page stores the network address 582 and its associated leaf identifier 584. It is noted that while FIG. 5's second-level hash tables 550 and 560 store /113-/128 IPv6 addresses for purposes of illustration, the exemplary second-level tables alternatively may be configured to store network addresses in other strides without loss of generality.

Advantageously, the novel organization of the hash tables 410, as exemplified by the hash table 500, enables an intermediate network node to locate a network address's routing information using relatively few dependent lookups, as compared with conventional techniques. That is, the node may locate routing information associated with a network address, such as an IPv6 address, by looking up an appropriate hash line in a hash table 410 using a first hash function $H_o$, looking up an appropriate page in a second-level table using a second hash function $H_x$, then searching the page's buckets for the memory location of the address's routing information. In sum, the address lookup procedure of the present invention corresponds to only a few (e.g., 3) dependent lookups. Furthermore, because of the extensible, bounded organization of the first and second-level tables, the invention also enables an intermediate network node 200 to locate routing information without having to default (i.e., "punt") to other, possibly slower address-lookup algorithms.

C. Inserting Addresses into a Lookup Table

According to the illustrative embodiment, each second-level table may be re-configured "on the fly." Specifically, when a new network address is inserted into a page that is "full," the newly added address still may be inserted into the second-level table by performing at least one of the following: (a) doubling the number of pages in the second-level table, (b) redistributing network addresses in the second-level table or (c) storing the additional address in an MTRIE accessible through the second-level table. Advantageously, the three aforementioned techniques may be used singly or in various combinations to insert new addresses into a second-level table.

By doubling the number of pages in a second-level table, twice as many buckets become available for storing network addresses and the locations of their associated routing information. Accordingly, a network address that does not "fit" in a second-level table because a page is full, instead may be added to an "enlarged" (e.g., doubled) version of the second-level data structure. To that end, additional memory may be allocated to enlarge the second-level table, and network addresses can be redistributed in the enlarged table using the table's associated hash function $H_x$. In addition, the value n 530 associated with the table is incremented by one to indicate that an additional bit is needed to index a page in the enlarged second-level table. While second-level tables in the illustrative embodiment are doubled in size, those skilled in the art will understand that such tables may be enlarged by other multipliers within the scope of the teachings herein.

Suppose a new IPv6 address is to be added to the page 1 in the exemplary second-level table 560. Since the page 1 is already full, i.e., its buckets contain the addresses A::C: 8008/127 and A::C:8006/115, the number of pages in the table 560 may be doubled to accommodate the newly added address. Therefore, the number of pages in the table 560 is increased from four ($2^2$) to eight ($2^3$), and addresses in the table, including the newly added address, are redistributed using the table's associated hash function $H_3$ indicated in the hash line 506. Moreover, because the number of pages in the table are doubled, the value n 530 in hash line 506 is increased from two to three, thereby indicating three bits are needed to index a page in the newly enlarged table 560.

Rather than increase the size of a second-level table to insert a new network address, addresses in the table may alternatively be redistributed using a different hash function $H_x$. A new address then may be inserted after the previously stored addresses are redistributed in the second-level table. For example, suppose again that a new IPv6 address is to be added to the page 1 in the second-level table 560. Where addresses in the table 560 were previously distributed among the table's pages using a hash function $H_3$, indicated in the hash line 506, they may be redistributed using a different hash function, e.g., $H_4$. In this case, the hash-function identifier 520 in hash line 506 is changed to reflect the new hash function $H_4$ is associated with the second-level table 560. As previously noted, the new hash function may employ a different hashing algorithm, or alternatively may be the same algorithm using a different seed value. After addresses in the second-level table have been redistributed by the new hash function $H_4$, the new IPv6 address may be added to an appropriate bucket 580. The process of selecting a new hash function $H_x$ may be repeated until a hash function is found that provides a suitable distribution that accommodates the newly added IPv6 address.

While the above-noted techniques for redistributing addresses in a second-level table work well for dependent network addresses, they do not work for non-independent network addresses. As used herein, non-independent addresses are defined as network addresses having identical prefix bits that generate the same hash-table index. Conversely, independent addresses contain different prefix bits and, unlike non-independent addresses, may therefore generate different hash-table indexes. For example, suppose the location of routing information for the non-independent IPv6 addresses A::B:0001/122 and A::B:0002/128 is accessible through the/113-/128 hash table. Because the addresses have the same 112-bit prefix A::B, their hashed prefix bits will always generate the same page index into a second-level table, regardless of which hash function $H_x$ is selected. On the other hand, if the addresses are independent, such as A::B:0001/122 and A::C:0002/128, their prefixes are different and therefore may not necessarily generate the same page index.

Figure 6:
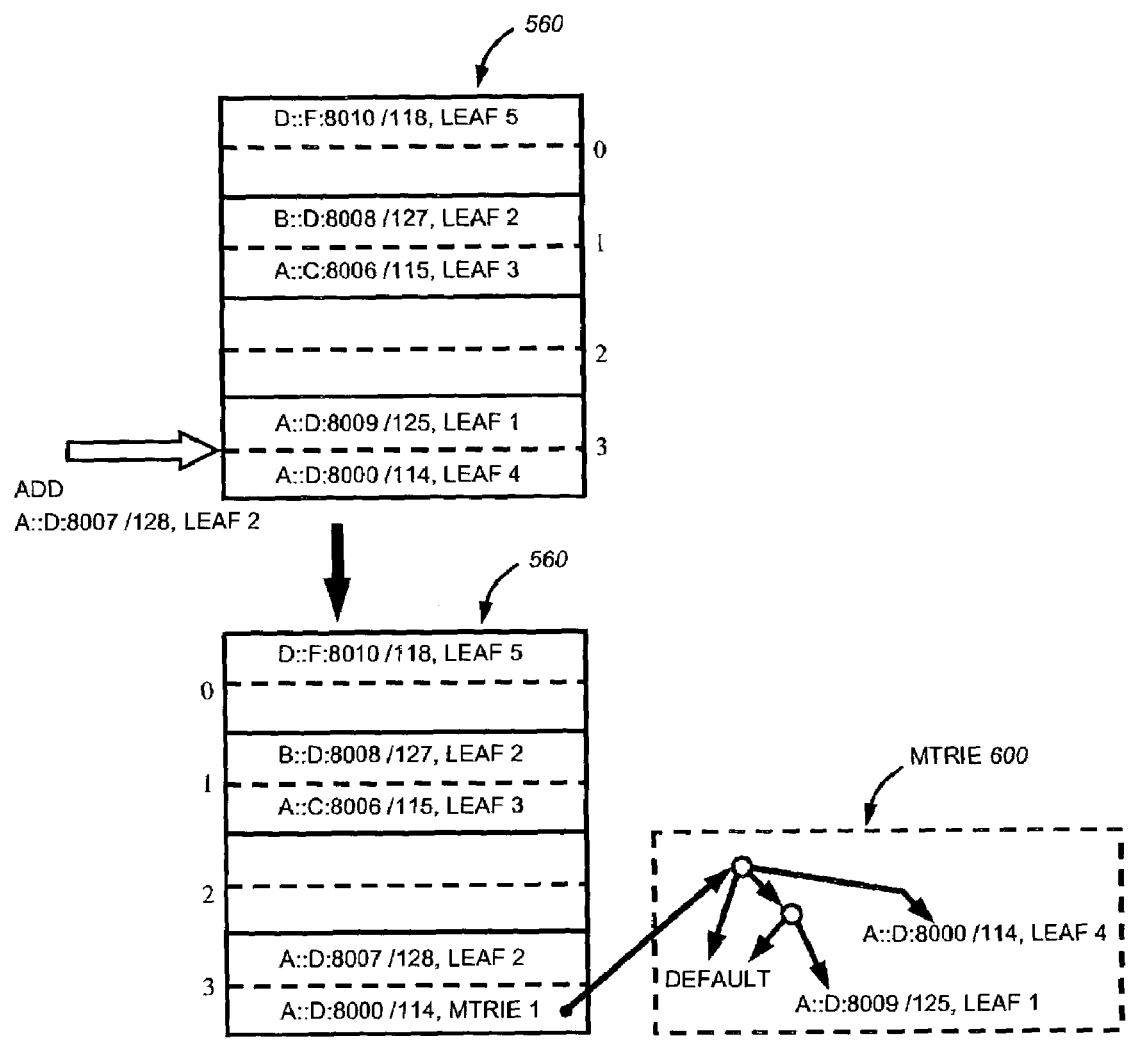
FIG. 6 is a schematic block diagram of an exemplary second-level table in which an MTRIE is created to accommodate an added network address, such as IPv6 address.

FIG. 6 illustrates a technique that enables a page in a second-level table to store more network addresses than it has buckets. As such, pages in the second-level table can store a plurality of non-independent or independent addresses that, when hashed by a function $H_x$, generate the same page index. When a new address is added to a full page, the page's "top-most" bucket stores the page's most-precise network address, and the remaining less-precise addresses are stored in an MTRIE accessible through the page's "bottom-most" bucket. Because the number of bits needed to disambiguate addresses stored in the MTRIE is limited to the difference of the addresses' subnet mask lengths and their prefix lengths, the number of levels implemented in the MTRIE may be relatively small. As such, the MTRIE may be searched in a small, bounded number of dependent lookups.

For example, as shown in FIG. 6, assume the IPv6 address A::D:8007/128 and the location of its routing information (e.g., Leaf 2) is added to the page 3 in the second-level table 560. Because the added IPv6 address is the most precise in the page, i.e., it has the longest subnet mask length (/128), the address is stored in the page's top-most bucket 580. The remaining, less-precise addresses A::D:8009/125 and A::D: 8000/114 are stored in an MTRIE 600. Because 112 prefix bits are hashed to generate a page index into the exemplary second-level table 560, and the table stores IPv6 addresses having subnet mask lengths in the stride /113 to /128, a maximum of 16 bits (128 minus 112) are needed to disambiguate (i.e., uniquely locate) addresses stored in the MTRIE. That is, addresses stored in the MTRIE may be located based on the value of their 16 least-significant address bits, e.g., bits 113-128. Similarly, even if the second-level table 560 stores addresses in a different 16-bit stride, only 16 bits following the hashed prefix address bits are needed to disambiguate addresses stored in the MTRIE 600. As a result, the MTRIE may be implemented using relatively few levels, e.g., 4 levels.

In addition to storing the locations of network addresses' routing information, the MTRIE 600 may also include a "default" route. Array elements in the MTRIE 600 that do not store the locations of routing information for specific network addresses may instead store references to a leaf containing default routing information. Alternatively, the array elements may store a default value, such as a NULL value. Broadly stated, the default routing information may correspond to any predetermined routing information 294. For instance, in the illustrative embodiment, an MTRIE's default routing information may be associated with the least-precise network address in the intermediate network node 200's routing table having the same prefix bits as the network addresses stored in the MTRIE. For example, because the MTRIE 600 stores the non-independent addresses A::D:8009/125 and A::D:8000/114, the default routing information may correspond to the least-precise IPv6 address having the 112-bit prefix A::D stored in the intermediate network node's routing tables.

Figure 7A:
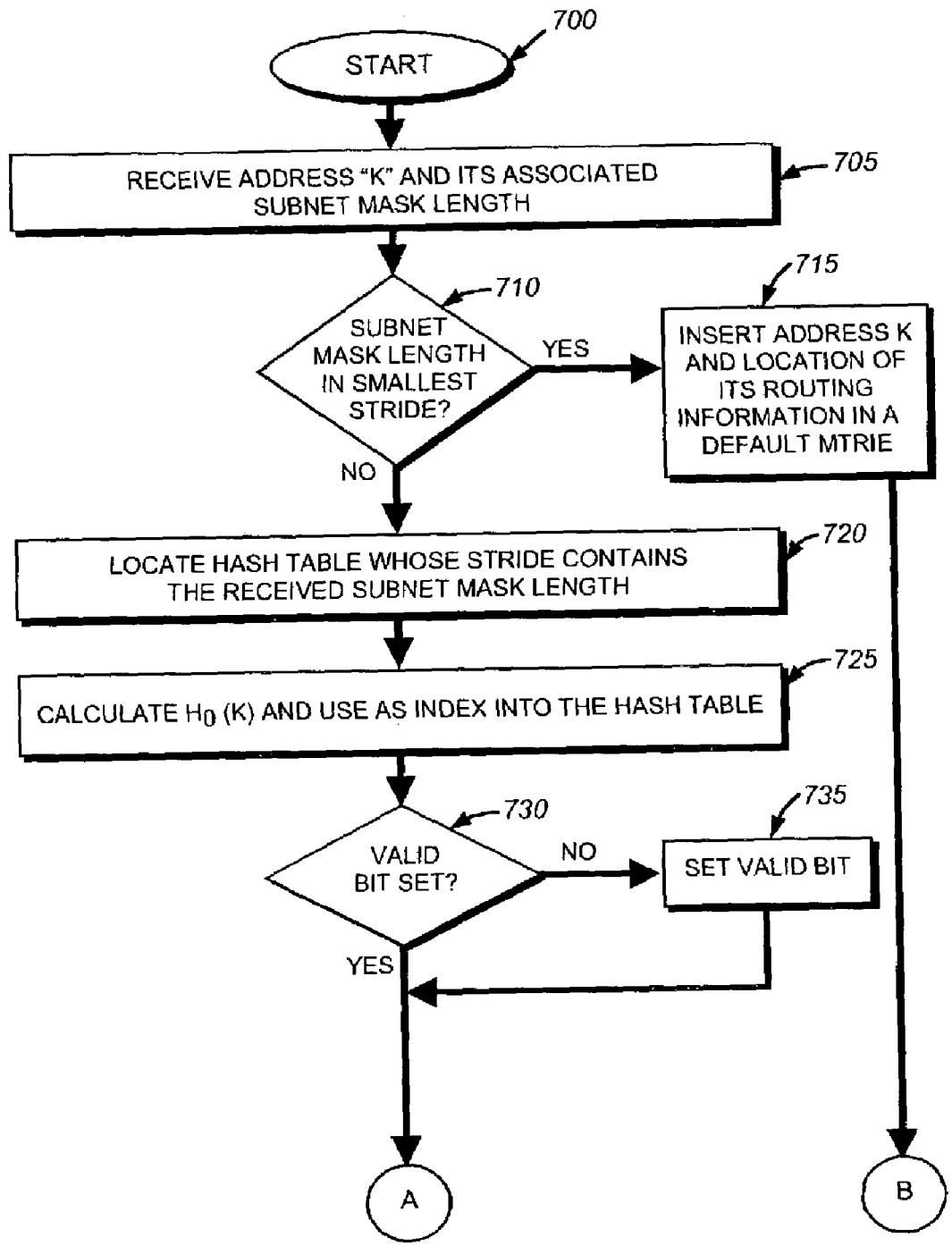
FIGS. 7A-B are a flowchart illustrating a sequence of steps for inserting an address into a second-level table in accordance with the present invention.
Figure 7B:
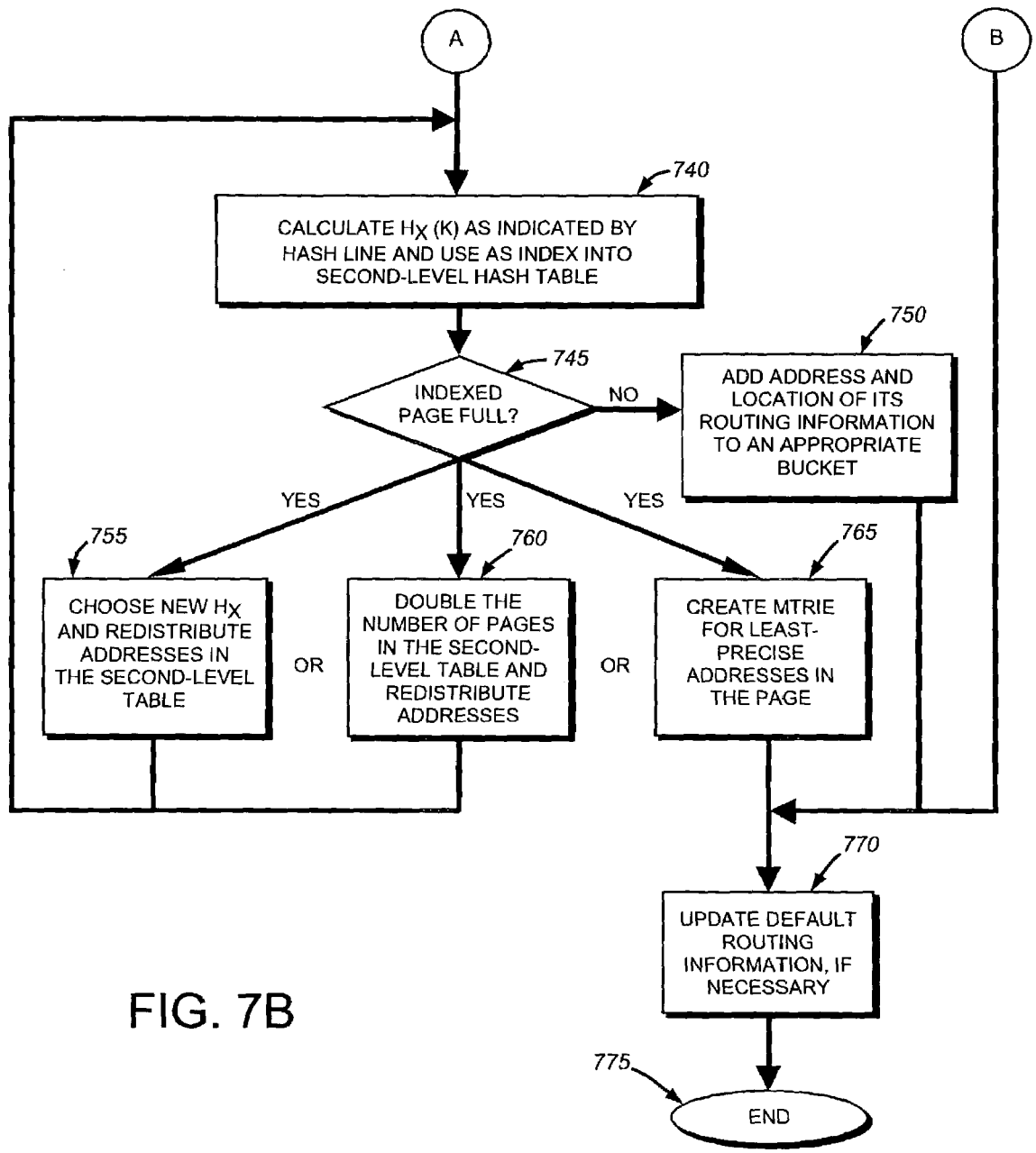

FIGS. 7A-B illustrate a sequence of steps for inserting an address into a second-level table. The sequence begins at step 700 and proceeds to step 705 where an address k, e.g., an IPv6 address, and its associated subnet mask length are received at the intermediate node 200. The address k may be received in the context of a network "control" packet formatted according to a conventional routing protocol, such as the Open Shortest Path First (OSPF) protocol, Interior Gateway Routing Protocol (IGRP), Border Gateway Protocol (BGP), etc. The received control packet may also include information indicating that the network address k should be added to the node's routing tables.

Operationally, the control packet is received at a line card 210 and is forwarded through the interface circuitry 215 and the backplane interface logic 220 to the RP module 260. Then, the packet is stored in the memory 290 and processed by the processor 270 in accordance with the router operating system 292. Based on the contents of the control packet, the operating system can determine the location of the address k's routing information, and, if necessary, generates a new leaf to store the address's routing information. Otherwise, the address k is associated with routing information 294 already stored in the memory 290.

At step 710, the router operating system 292 determines whether the address k's subnet mask length is within a stride of the smallest (i.e., least-precise) mask lengths stored in the intermediate network node. For example, assuming the operating system organizes 128-bit IPv6 addresses in a set of hash tables 410 arranged according to constant 16-bit strides, the /1-/16 stride corresponds to the node's smallest stride. If the determination at step 710 is affirmative, then the sequence advances to step 715 where the address k and its associated routing information are stored, e.g., in a conventional 4:4:4:4 MTRIE. The operating system then updates any default routing information, e.g., in other MTRIE structures, that may be affected by the addition of the address k, at step 770. The sequence ends at step 775.

On the other hand, if address k's associated subnet mask length is not within the smallest stride, then, at step 720, the operating system 292 locates the hash table 410 whose stride contains the address k's subnet mask length. Next, at step 725, a range of prefix bits 440 associated with the hash table is located in the address k and is hashed by a hash function $H_o$, such as a CRC32 function. Here, $H_o(k)$ denotes the function $H_o$ applied to the prefix bits in address k. The generated hash value is then used to index a hash line in the located hash table. Notably, the generated hash value $H_o(k)$ may be appropriately masked or truncated to ensure that it corresponds to a valid hash-line index.

At step 730, the value of valid bit 510 in the indexed hash line is evaluated to determine whether the hash line is already in use. If the value of the valid bit indicates the indexed hash line is not in use, then at step 735, that value is changed to indicate the hash line is now in use. Also, in the event that a second-level table has not already been allocated for the indexed hash line, the router operating system 292 may be configured to allocate a new second-level table. In such a case, the value of a pointer 540 in the indexed hash line is modified to reference the location of the newly allocated second-level table.

Next, at step 740, a second hash function $H_x$, such as a CRC32 function, is identified based on the value of a hash-function identifier 520 in the indexed hash line. Illustratively, the hash function $H_x$ may be a CRC32 function which is initialized by a seed value specified by the identifier 520. The range of prefix bits 440 associated with the hash table is again located in the address k, and the prefix bits are hashed by the function $H_x$. A value n 530 in the indexed hash line indicates the number of bits in the generated hash value $H_x(k)$ required to locate a page in the hash line's corresponding second-level table, which is located by the hash line's pointer 540. For example, the n least-significant bits in $H_x(k)$ may be used to index a page in the second-level table.

At step 745, the operating system determines whether the indexed page is full, i.e., its buckets already contain pairs of addresses 582 and leaf pointers 584 (or an MTRIE pointer). If at least one bucket in the indexed page is empty, then at step 750, the address k, its subnet mask length and the location of its routing information, are stored in the indexed page. The address k is preferably inserted in a manner that ensures addresses are stored in the page's buckets in order of decreasing prefix length (i.e., "longest-prefix-match" ordering). At step 770, default routing information, e.g., in MTRIE structures accessible through other hash tables 410, is updated if it is affected by the addition of the address k. The sequence then ends at step 775.

If, at step 745, the indexed page is determined to be full, then the sequence may progress along one of the paths specified at steps 755, 760 and 765. Along a first path, at step 755, addresses within the second-level table may be redistributed by selecting a new hash function $H_x$ which randomly distributes addresses among the pages in the second-level table. Illustratively, the new hash function may be a CRC32 function which is initialized by a different seed value than the original $H_x$ function specified by the hash-function identifier 520. Accordingly, the hash-function identifier 520 is changed to identify the newly selected seed value. After redistributing addresses in the second-level table, at step 755, the sequence returns to step 740 using the new $H_x$ function.

Alternatively, when the indexed page is determined to be full at step 745, the sequence may advance to step 760 where the number of pages in the second-level table is doubled. To that end, the operating system may have to allocate additional memory to store the second-level table. Network addresses stored in the second-level table are then redistributed throughout the enlarged table using the hash function $H_x$ indicated by the hash-function identifier 520. Further, the value n 530 is incremented by one to indicate an additional bit is needed to index pages in the enlarged second-level table. After redistributing addresses in the second-level table, at step 760, the sequence returns to step 740.

When the indexed page is determined to be full at step 745, the sequence also may progress along the path beginning at step 765. Here, the address k and the location of its associated routing information are inserted into an MTRIE accessible through the indexed page. Specifically, if not already created, the MTRIE is arranged so as to store the indexed page's least-precise addresses, i.e., having the smallest subnet mask values. Thus, if the address k has the largest subnet mask length in the indexed page, then it is stored in the page's top-most bucket and the MTRIE is accessed through the page's bottom-most bucket. In contrast, if the address k is one of the page's least-precise addresses, then it is stored in an appropriate entry in the MTRIE. Next, at step 770, default routing information, e.g., in other MTRIE structures, is updated if it is affected by the addition of the address k. The sequence ends at step 775.

D. Looking Up an Address's Routing Information

In accordance with the illustrative embodiment, the forwarding engine 300 locates a network address's routing information by searching a set of lookup tables, such as the hash tables 410, in order of decreasing prefix lengths until the routing information is found. To that end, processing elements 330 in different columns of the forwarding engine 300 may be configured to perform table lookups in different hash tables 410 resident in the external memory resources 340. Moreover, processing elements in multiple columns (e.g., 4 columns) of the forwarding engine may concurrently search a plurality of the hash tables. Further to the illustrative embodiment, a network address's associated routing information which cannot be located in any of the hash tables 410 is stored in an MTRIE that, like the tables, may be searched using a relatively small, bounded number of dependent lookups. Accordingly, a column of processing elements 330 in the forwarding engine 300 may be configured to search the MTRIE in the event that processing elements in previous columns were not able to locate the address's routing information in the set of hash tables 410.

Figure 8:
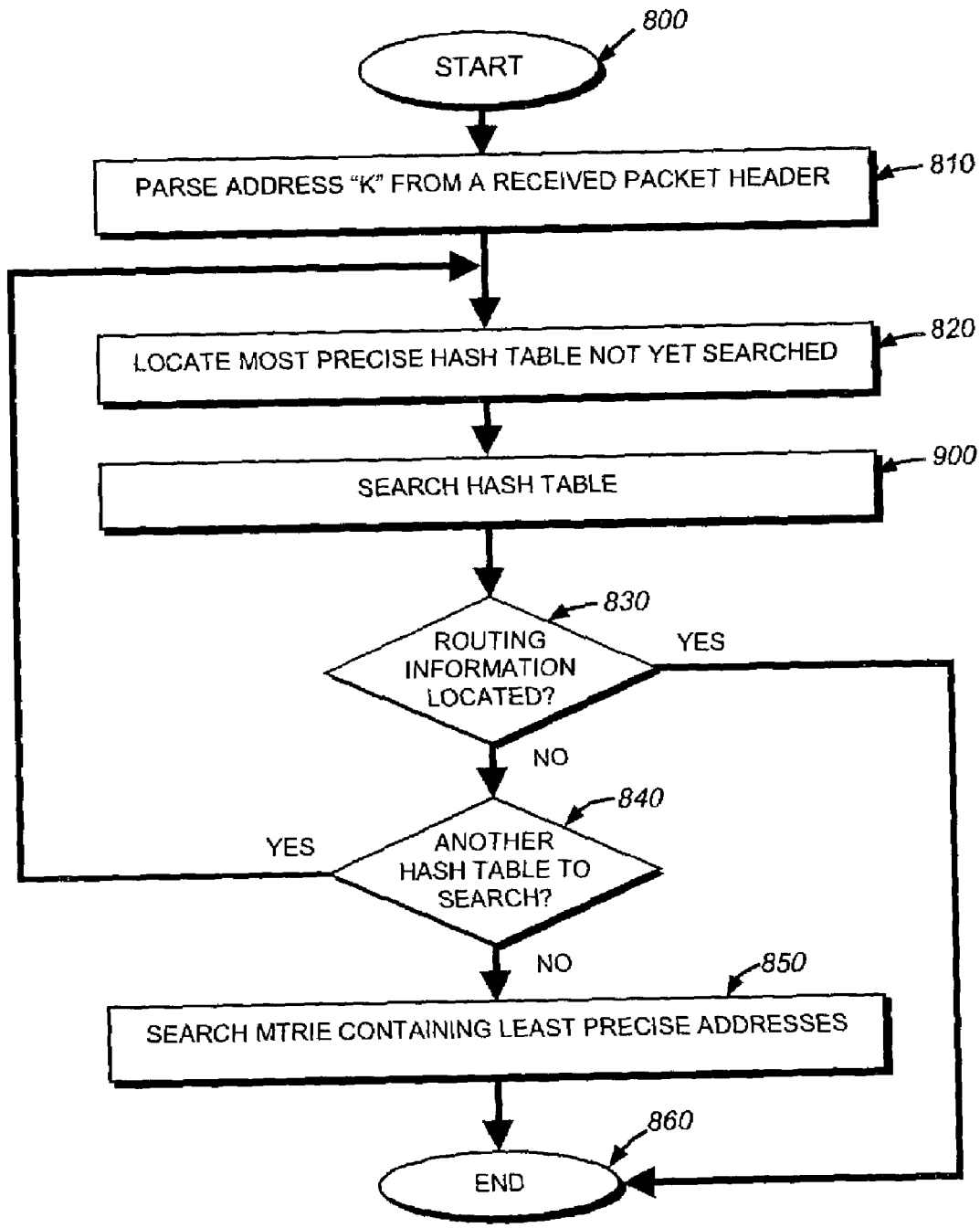
FIG. 8 is a flowchart illustrating a sequence of steps for looking up the location of an address's routing information from a set of first-level hash tables or an MTRIE, in accordance with the present invention.

FIG. 8 is a flowchart illustrating a sequence of steps for looking up the location of an address's routing information in an intermediate network node 200. The sequence starts at step 800 and proceeds to step 810 where a network address k, such as an IPv6 address, is parsed from a received data packet. More specifically, the data packet is received at a line card 210 and is forwarded through the interface circuitry 215 and the backplane interface logic 220 to the FP module 230. The packet is then stored in the packet buffer 240 and its header is transferred to the forwarding engine 300 for processing. The engine parses the destination address k from the header in order to make a forwarding decision for the received packet. Here, it is assumed the address k's associated subnet mask length cannot be obtained from the packet header. The forwarding engine then makes its forwarding decision based, in part, on the address's associated routing information, which is located in accordance with FIG. 8's remaining steps.

At step 820, the forwarding engine locates, e.g., in an appropriate memory 340, the most-precise hash table 410 that has not yet been searched for the address k's routing information. For example, assuming the address k is a 128-bit IPv6 address and the hash tables 410 are arranged according to constant 16-bit strides, then the most-precise, unsearched hash table initially corresponds to the /113-/128 hash table. Next, at step 900, the hash table is searched, as will be described in more detail with regards to FIG. 9.

If, at step 830, the address k's routing information is located in the hash table, then the sequence ends at step 860. Otherwise, the forwarding engine determines whether there is another hash table 410 to search, at step 840. If so, the sequence returns to step 820. It is noted that when the hash tables 410 are searched in parallel by the forwarding engine, the steps 820-840 may be performed concurrently by different processing elements 330 in the engine 300.

If all the hash tables 410 have been searched and the memory location of address k's routing information has not be identified, then, at step 850, the forwarding engine searches an MTRIE corresponding to the least-precise addresses in the node 200's routing tables. For example, the MTRIE may store the location of routing information for IPv6 addresses having subnet mask lengths within the least-precise stride of /1 to /16. The sequence ends at step 860. Because the sequence of steps in FIG. 8 can locate routing information for network addresses of any arbitrary subnet mask length, either in a hash table 410 or in the MTRIE, the technique does not need to punt its execution to other, possibly slower, address lookup algorithms.

Figure 9:
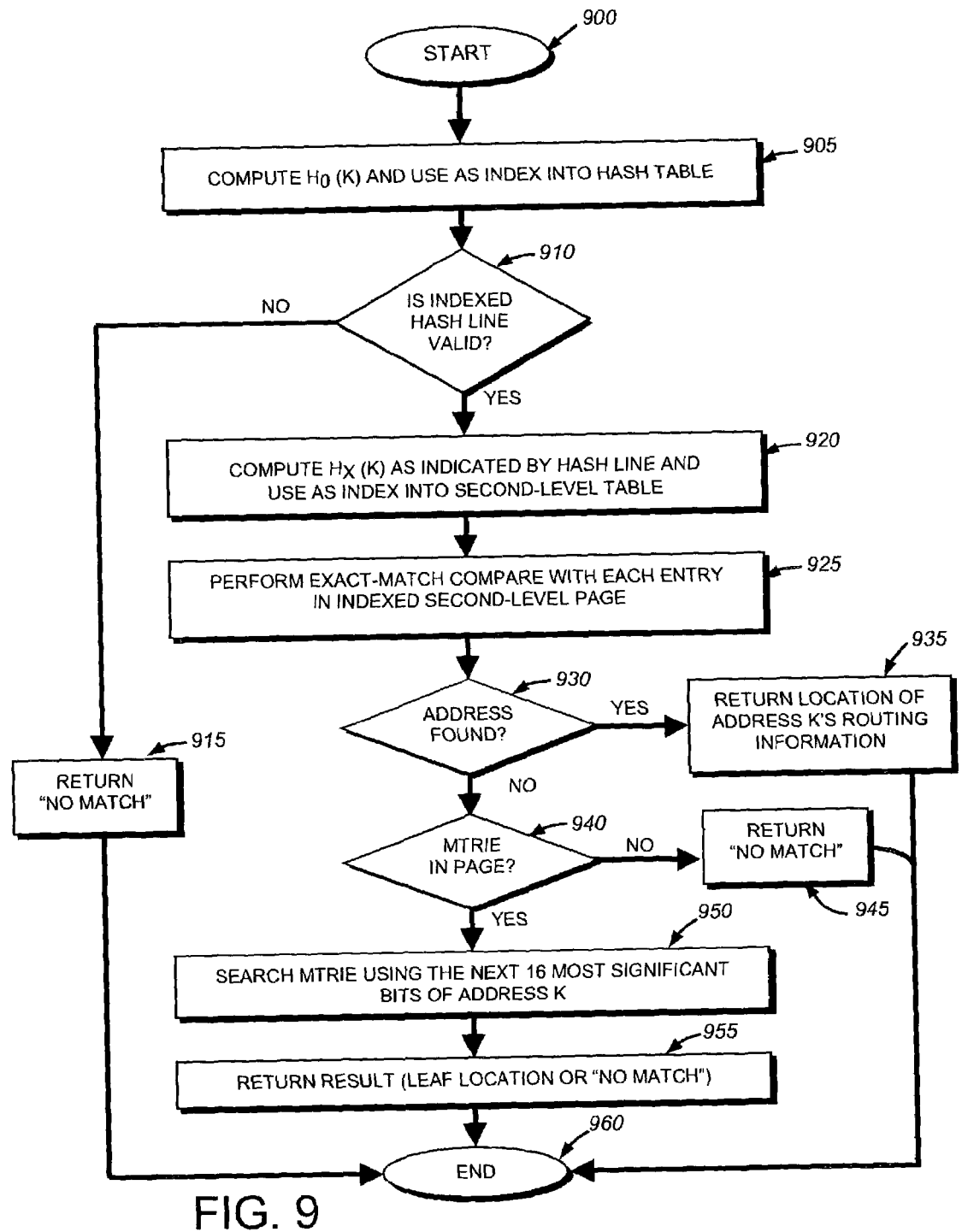
FIG. 9 is a flowchart illustrating a sequence of steps for looking up the location of an address's routing information using an individual first-level hash table in accordance with the present invention.

FIG. 9 is a flowchart illustrating a sequence of steps that the forwarding engine 300 may perform for looking up the memory location of an address k's routing information from a hash table 410. The sequence starts at step 900 and proceeds to step 905 where a range of prefix bits 440 associated with the hash table is located in the address k and is hashed by a hash function $H_o$, such as a CRC32 function. Here, $H_o(k)$ denotes the function $H_o$ applied to the prefix bits in address k. The generated hash value is then used to index a hash line in the located hash table. Notably, the generated hash value $H_o(k)$ may be appropriately masked or truncated to ensure that it corresponds to a valid hash-line index.

Next, at step 910, the forwarding engine determines whether the indexed hash line is valid based on the value of a valid bit 510 in the hash line. If the engine determines the hash line is invalid, then, at step 915, a "No Match" indication is returned, e.g., to the next processing element 330 configured to search for the address k's routing information. The sequence then ends at step 960.

However, if at step 910 the value of the hash line's valid bit 510 indicates that the hash line is valid, then, at step 920, a second hash function $H_x$ is identified based on the value of a hash-function identifier 520 in the indexed hash line. Illustratively, the hash function $H_x$ may be a CRC32 function which is initialized by a seed value specified by the identifier 520. The range of prefix bits 440 associated with the hash table is again located in the address k, and the prefix bits are hashed by the function $H_x$. A value n 530 in the indexed hash line indicates the number of bits in the generated hash value $H_x(k)$ required to locate a page in the hash line's corresponding second-level table, which is located by the hash line's pointer 540. For example, the n least-significant bits in $H_x(k)$ may be used to index a page in the second-level table.

At step 925, the buckets in the indexed page are then searched, preferably in order of decreasing prefix lengths, and the forwarding engine performs an "exact-match comparison" test with each address stored in the buckets. At step 930, if the network address stored in a bucket equals the address k, then the exact-match comparison test is satisfied and the address k is determined to be found in the hash table 410. In this case, the leaf identifier stored in the bucket is returned, at step 935, and the sequence ends at step 960.

If the address k is not located in the indexed page's buckets, then at step 940, the forwarding engine determines whether the bottom-most bucket stores a reference to an MTRIE. If not, then a "No Match" indication is returned at step 945, and the sequence ends at step 960. Otherwise, the sequence proceeds to step 950 where the MTRIE is searched based on the next 16 most-significant bits in the address k situated after the hashed prefix bits 440. If the forwarding engine locates the address k in the MTRIE, then its corresponding leaf identifier is returned at step 955. On the other hand, if the address is not found in the MTRIE, then a "No Match" indication may be returned, unless a default route in the MTRIE is located instead. In that case, the leaf location of the default route is returned at step 955. The sequence ends at step 960.

E. Conclusion

The foregoing has been a detailed description of an illustrative embodiment of the invention. Various modifications and additions can be made without departing from the spirit and scope of the invention. For example, although the exemplary set of hash tables 410 is arranged according to constant 16-bit strides, those skilled in the art will understand that the tables may be associated with variable length strides, e.g., that differ from table to table. Additionally, while routing information 294 in the illustrative embodiment is stored in "leaf" data structures in the external memory resources 340, it is also contemplated that the routing information may be directly stored in buckets of appropriate second-level tables. That is, rather than storing an address 582 and a leaf identifier 584, a bucket 580 instead may be configured to store an address and its associated routing information. Also, the MTRIE data structures employed in the illustrative embodiment may alternatively be implemented using other data structures, e.g., other trie-based data structures.

The inventive technique may be made even more efficient by implementing the first-level hash tables 410 in CAMs. Because the number of first-level hash tables is relatively small, a small number of CAM entries may be employed to quickly perform address lookups, e.g., based on the value of a network address. Accordingly, the results of these lookups then may be used to locate appropriate second-level tables and generate page indexes into the second-level tables. Notably, CAMs may be used to implement some or all of the second-level tables.

It is expressly contemplated that the teachings of this invention can be implemented as software, including a computer-readable medium having program instructions executing on a computer, hardware, firmware, or a combination thereof. Accordingly this description is meant to be taken only by way of example and not to otherwise limit the scope of the invention.

What is claimed is:

1. A method for an intermediate network node to efficiently lookup routing information associated with a network address, the method comprising: selecting a lookup table from a set of one or more lookup tables in the intermediate network node, each lookup table being associated with a different range of subnet mask lengths, wherein the selected lookup table is associated with the largest subnet mask lengths not yet searched; searching the selected lookup table based on the value of the network address using a bounded number of dependent lookups to locate a memory location of the network address's routing information; if the network address is found in the selected lookup table, providing the memory location of the network address's routing information from the selected lookup table; if the network address is not found in the selected lookup table, then repeating the steps of selecting and searching the selected lookup table, until the memory location of the network address's routing information is found or until all the lookup tables have been searched; if the network address is found in any of the lookup tables, providing the memory location of the network address's routing information from one of the lookup tables; and if the network address is not found in any of the lookup tables, searching an MTRIE for the memory location of the network address's routing information and providing the memory location of the network address's routing information from the MTRIE.

2. The method according to claim 1, further comprising organizing each lookup table in the set of one or more lookup tables as a first-level hash table having a plurality of indexed hash lines, each indexed hash line associated with a corresponding second-level table configured to store a memory location of routing information for at least one network address.

3. The method according to claim 2, further comprising indexing a hash line in a first-level hash table based on the result of applying a first hash function to a first set of prefix bits in the network address.

4. The method according to claim 3, further comprising indexing a page in a second-level table based on the result of applying a second hash function to a second set of prefix bits in the network address.

5. The method according to claim 4, wherein the first and second hash functions are CRC32 hash functions.

6. The method according to claim 4, wherein the first and second set of prefix bits in the network address are the same prefix bits.

7. The method according to claim 2, further comprising storing, in the second-level tables, the location of routing information for network addresses in order of decreasing prefix length.

8. The method according to claim 2, wherein each hash line in a first-level hash table includes a valid bit, a hash-function identifier, a pointer to the hash line's corresponding second-level table and a value indicating a number of pages which may be indexed in the hash line's corresponding second-level table.

9. The method according to claim 1, further comprising:
    receiving a data packet containing the network address at the intermediate network node; and
    extracting the network address from the received data packet.

10. The method according to claim 1, wherein the step of searching the selected lookup table comprises searching selected lookup table in order of decreasing prefix lengths.

11. The method according to claim 1, wherein the network address is an IPv6 address.

12. An apparatus adapted to lookup routing information associated with a network address using a bounded number of dependent lookups, the apparatus comprising:
    means for selecting a lookup table from a set of one or more lookup tables in the intermediate network node, each lookup table being associated with a different range of subnet mask lengths, wherein the selected lookup table is associated with the largest subnet mask lengths not yet searched;
    means for searching the selected lookup table based on the value of the network address to locate a memory location of the network address's routing information;
    means for searching an MTRIE for the memory location of the network address's routing information only if the network address is not found in any of the lookup tables; and
    means for providing the memory location of the network address's routing information.

13. The apparatus according to claim 12, further comprising:
    means for receiving a data packet containing the network address at the intermediate network node; and
    means for extracting the network address from the received data packet.

14. The apparatus according to claim 12, wherein the means for searching the selected lookup table further comprises means for searching the selected lookup table in order of decreasing prefix lengths.

15. A computer-readable media including instructions for execution by a processor, the instructions for a method of efficiently lookup routing information associated with a network address, the method comprising the steps: selecting a lookup table from a set of one or more lookup tables in the intermediate network node, each lookup table being associated with a different range of subnet mask lengths, wherein the selected lookup table is associated with the largest subnet mask lengths not yet searched; searching the selected lookup table based on the value of the network address using a bounded number of dependent lookups to locate a memory location of the network address's routing information; if the network address is found in the selected lookup table, providing the memory II location of the network address's routing information from the selected lookup table; if the network address is not found in the selected lookup table, then repeating the steps of selecting and searching the selected lookup table, until the memory location of 14 the network address's routing information is found or until all the lookup tables have been searched; if the network address is found in any of the lookup tables, providing the memory location of the network address's routing information from one of the lookup tables; and if the network address is not found in any of the lookup tables, searching an MTRIE for the memory location location of the network address's routing information and providing the memory location of the network address's routing information from the MTRIE.

16. An intermediate network node adapted to lookup routing information associated with a network address using a bounded number of dependent lookups, the node comprising:
  a network interface for receiving a packet containing the network address;
  a memory configured to store:
    (a) at least one first-level hash table having a plurality of indexed hash lines, each indexed hash line associated with a corresponding second-level table configured to store a memory location of routing information for at least one network address, and
    (b) at least one MTRIE configured to store a memory location of routing information for at least one network address; and,
  a forwarding engine including one or more processing elements configured to lookup the location of the network address's associated routing information in the at least one first-level hash table, and only if the location of the network address's associated routing information is not found, to lookup the location of the network address's associated routing information in the at least one MTRIE.

17. The intermediate node according to claim 16, wherein a hash line in a first-level hash table is indexed based on the result of applying a first hash function to a first set of prefix bits in the network address.

18. The intermediate node according to claim 17, wherein a page in a second-level table is indexed based on the result of applying a second hash function to a second set of prefix bits in the network address.

19. The method according to claim 18, wherein the first and second set of prefix bits in the network address are the same prefix bits.

20. The intermediate node according to claim 16, wherein the second-level tables store the location of routing information for network addresses in order of decreasing prefix length.

21. The intermediate node according to claim 16, wherein each hash line in a first-level hash table includes a valid bit, a hash-function identifier, a pointer to the hash line's corresponding second-level table and a value indicating a number of pages which may be indexed in the hash line's corresponding second-level table.

22. The intermediate node according to claim 16, wherein the network address is an IPv6 address.

* * * * *